United States Patent
Terada

(10) Patent No.: US 7,827,285 B2
(45) Date of Patent: Nov. 2, 2010

(54) INFORMATION PROCESSING APPARATUS, INFORMATION PROCESSING SYSTEM, INFORMATION PROCESSING METHOD AND PROGRAM

(75) Inventor: Masahiro Terada, Asaka (JP)

(73) Assignee: FujiFilm Corporation, Tokyo (JP)

( * ) Notice: Subject to any disclaimer, the term of this patent is extended or adjusted under 35 U.S.C. 154(b) by 1424 days.

(21) Appl. No.: 11/151,253

(22) Filed: Jun. 14, 2005

(65) Prior Publication Data

US 2006/0015620 A1 Jan. 19, 2006

(30) Foreign Application Priority Data

Jun. 15, 2004 (JP) ............... 2004-176350

(51) Int. Cl.
*G06F 15/173* (2006.01)
*G06F 3/12* (2006.01)
(52) U.S. Cl. .................... 709/226; 358/1.15
(58) Field of Classification Search ......... 370/352–356; 358/1.15; 709/229, 226
See application file for complete search history.

(56) References Cited

U.S. PATENT DOCUMENTS

| | | | |
|---|---|---|---|
| 2002/0122201 A1* | 9/2002 | Haraguchi et al. | 358/1.15 |
| 2002/0178272 A1* | 11/2002 | Igarashi et al. | 709/229 |
| 2003/0025933 A1 | 2/2003 | Kimura et al. | |
| 2003/0065807 A1 | 4/2003 | Satomi et al. | |
| 2003/0181200 A1 | 9/2003 | Iida | |
| 2004/0001226 A1* | 1/2004 | Ohtuka | 358/1.15 |

FOREIGN PATENT DOCUMENTS

| | | |
|---|---|---|
| JP | 2002-133133 A | 5/2002 |
| JP | 2002-251355 A | 9/2002 |
| JP | 2002-351944 A | 12/2002 |
| JP | 2003-44582 A | 2/2003 |
| JP | 2003-46841 A | 2/2003 |
| JP | 2003-263471 A | 9/2003 |
| JP | 2003-281028 A | 10/2003 |
| JP | 2004-70614 A | 3/2004 |

* cited by examiner

*Primary Examiner*—Rasha S Al Aubaidi
*Assistant Examiner*—Sonia Gay
(74) *Attorney, Agent, or Firm*—Birch, Stewart, Kolasch & Birch, LLP

(57) ABSTRACT

A user can efficiently receive a printing service without a troublesome operation. A request including order information for placing a printing order regarding image data stored in a recorder is sent from a mobile phone to a mobile phone site server together with an identification code of the mobile phone. The mobile phone site server issues an ID, and sends the ID, user information obtained from the identification code, and the order information to a service provision server. The service provision server registers the ID, the user information, and the order information. The ID is also sent to the mobile phone, and the mobile phone sends the ID to the recorder. The recorder sends the image data and the ID to the service provision server. The service provision server relates the image data and the order by using the ID, and prints the image data.

8 Claims, 7 Drawing Sheets

INFORMATION PROCESSING APPARATUS, INFORMATION PROCESSING SYSTEM, INFORMATION PROCESSING METHOD AND PROGRAM

BACKGROUND OF THE INVENTION

1. Field of the Invention

The present invention relates to an information processing apparatus for providing a service according to information sent from various apparatuses. The present invention also relates to a mobile terminal, an information storage apparatus, an information processing system, an information processing method, and a program for causing a computer to execute the information processing method.

2. Description of the Related Art

Digital home appliances that can store image data, such as DVD/HDD recorders, have become widespread. Such a digital home appliance can be used as a server at home. For example, not only a TV program but also image data obtained by a digital camera can be stored in a recorder by installing a memory card slot to the recorder. In addition, image data can also be stored therein by connection to a digital camera via an interface such as USB. Since such a recorder has a large-capacity hard disc, a large amount of image data can be stored therein.

Furthermore, a recorder having an Ethernet® terminal has been proposed. Such a recorder can access the Internet via a broadband router at home, and programmed recording of a TV program can be easily carried out by obtaining a TV program guide from a server.

Like a personal computer, such a recorder can carry out various kinds of functions according to software installed therein. For example, such a recorder can download image data or moving image data from a specific server, and can upload image data or moving image data that have been stored therein to a specific server. Therefore, such a recorder can be used for downloading image data by accessing a server via a user interface displayed on a TV set. In addition, such a recorder can be used for placing a printing order regarding image data by uploading the image data stored therein to a server that provides a printing service.

Meanwhile, following the spread of camera phones, which are mobile phones with built-in digital cameras, a system has been proposed for placing a printing order regarding image data by uploading the image data stored in a camera phone to a server that provides a printing service (see Japanese Unexamined Patent Publication No. 2002-251355 or 2003-263471, for example).

Furthermore, various kinds of printing services have been proposed by using a server. For example, a system has been proposed in Japanese Unexamined Patent Publication No. 2002-133133 for storing image data sent from a user for a predetermined period and for using the image data in the case of reception of a printing order regarding the image data. Furthermore, in U.S. patent application Publication No. 20030065807 has been proposed a system for limiting image data to be received, by receiving only image data, to which predetermined information has been added.

In the case where a printing order is placed by using a recorder described above, the recorder does not have information for specifying the name, the address, and the phone number of a user, and information for specifying a method of payment. Therefore, the user needs to send the information to a server by inputting the information each time he/she places an order, which is troublesome.

On the contrary, a mobile phone enables user identification by the phone number, and a user thereof is billed via his/her mobile phone carrier. Therefore, a server can manage billing regarding a printing order. However, a bandwidth of a mobile phone connection is narrower than a broadband connection, which is not suitable for placing a printing order regarding a large amount of image data.

SUMMARY OF THE INVENTION

The present invention has been conceived based on consideration of the above circumstances. An object of the present invention is therefore to enable a user to efficiently receive a service such as a printing order without a troublesome operation.

An information processing apparatus of the present invention comprises:

communication means for sending and receiving various kinds of information;

information processing means for providing a service according to the various kinds of information received by the communication means; and control means for controlling the communication means and the information processing means in order to cause first information and second information to be received and in order to cause the service that relates the first information and the second information to be provided according to identification information. The first information is sent from a first apparatus that enables user identification, and includes user identification information for identifying a user and a request for provision of the service. The second information is sent from a second apparatus that does not enable user identification.

In the information processing apparatus of the present invention, the control means may relate the first information and the second information based on the identification information issued by the first apparatus, the second apparatus, or the information processing apparatus itself.

In the case where the first apparatus issues the identification information, the first apparatus sends the identification information to the information processing apparatus together with the first information, and sends the identification information to the second apparatus together with an instruction to send the second information.

In the case where the information processing apparatus issues the identification information, the information processing apparatus sends the identification information to the first apparatus, and the first apparatus sends the identification information to the second apparatus together with the instruction to send the second information.

In the case where the second apparatus issues the identification information, the second apparatus sends the identification information to the information processing apparatus together with the second information. The second apparatus also sends the identification information to the first apparatus or displays the identification information on display means connected to the second apparatus.

In the information processing apparatus of the present invention, in the case where the request for provision of the service is a request for placing a printing order regarding an image, and in the case where the second information is image data representing the image regarding which the printing order is placed, the control means may provide a printing service of the image data by relating the request for placing the printing order to the image data.

In the information processing apparatus of the present invention, the control means may generate billing information for the service to the user who sent the first information, based on the user identification information included in the first information.

A mobile terminal of the present invention comprises:

storage means for storing user identification information for identifying a user;

first communication means for communicating with the information processing apparatus of the present invention; and second communication means for communicating with an information storage apparatus that stores second information. The mobile terminal of the present invention is characterized by that the mobile terminal comprises control means for controlling the storage means, the first communication means, and the second communication means for causing the second information that is to be sent to the information processing apparatus to be specified in the information storage apparatus, for causing first information including the user identification information and a request for provision of a service to be sent to the information processing apparatus, for causing addressee information representing an addressee of the specified second information and sent from the information processing apparatus to be received and to be sent to the information storage apparatus, and for causing the information storage apparatus to be instructed to send the specified second information together with identification information for identifying the first information to the addressee.

In the mobile terminal of the present invention, the identification information may be issued by the information processing apparatus, the information storage apparatus, or the mobile terminal itself.

An information storage apparatus of the present invention comprises:

first communication means for communicating with the information processing apparatus of the present invention;

second communication means for communicating with the mobile terminal of the present invention; and storage means for storing second information. The information storage apparatus is characterized by that the information storage apparatus comprises control means for controlling the storage means, the first communication means, and the second communication means for causing specification of the second information that is to be sent to the information processing apparatus to be received from the mobile terminal, for causing addressee information representing an addressee of the specified second information to be received from the mobile terminal together with identification information that identifies the first information and an instruction to send the specified second information to the addressee, and for causing the identification information and the specified second information to be sent to the addressee.

In the information storage apparatus of the present invention, the identification information may be issued by the information processing apparatus, or the mobile terminal, or the information storage apparatus itself.

An information processing system of the present invention comprises:

a first apparatus that enables user identification and sends first information including user identification information and a request for provision of a service;

a second apparatus that does not enable user identification and stores and sends second information; and the information processing apparatus of the present invention.

In the information processing system of the present invention, the first apparatus and the second apparatus may be the mobile terminal and the information storage apparatus of the present invention, respectively.

A first information processing method of the present invention is a method for an information processing apparatus comprising communication means for sending and receiving various kinds of information and information processing means for providing a service according to the various kinds of information received by the communication means. The first information processing method comprises the steps of:

receiving first information including user identification information for identifying a user and a request for provision of the service from a first apparatus that enables user identification and receiving second information from a second apparatus that does not enable user identification; and providing the service relating the first information and the second information according to identification information.

The first image processing method of the present invention may further comprise the step of generating billing information for the service to the user who sent the first information, based on the user identification information included in the first information.

A second information processing method of the present invention is a method for a mobile terminal comprising storage means for storing user identification information that identifies a user, first communication means for communicating with the information processing apparatus of the present invention, and second communication means for communicating with an information storage apparatus that stores second information. The second information processing method comprises the steps of:

specifying the second information to be sent to the information processing apparatus in the information storage apparatus;

sending first information including the user identification information and the request for provision of the service to the information processing apparatus;

receiving addressee information representing an addressee of the specified second information from the information processing apparatus;

sending the addressee information to the information storage apparatus; and sending an instruction to the information storage apparatus to send the specified second information to the addressee, together with identification information that identifies the first information.

A third information processing method of the present invention is a method for an information storage apparatus comprising first communication means for communicating with the information processing apparatus of the present invention, second communication means for communicating with the mobile terminal of the present invention, and storage means for storing second information. The third information processing method comprises the steps of:

receiving, from the mobile terminal, specification of the second information to be sent to the information processing apparatus;

receiving from the mobile terminal an instruction to send the specified second information to an addressee, together with addressee information representing the addressee of the specified second information and identification information for identifying the first information; and sending the identification information and the specified second information to the addressee.

The first to third image processing methods of the present invention may be provided as programs for causing a computer to execute the image processing methods.

According to the present invention, the information processing apparatus receives the first information including the user identification information and the request for provision of the service from the first apparatus that enables user identification, and receives the second information sent from the second apparatus that does not enable user identification. The service relating the first information and the second information is then provided based on the identification information. Therefore, if the user only sends the first information and the second information to a server, the service relating the first information and the second information is provided to the user.

By relating the first information and the second information based on the identification information issued by the first apparatus, the second apparatus, or the information processing apparatus, the first information and the second information can be related easily.

In the case where the first information is information for placing the printing order and the second information is the image data to be printed, the printing service is provided to the user by relating the information requesting the printing and the image data if the user simply sends the information of printing request and the image data.

Furthermore, by billing the user who sent the first information for the service according to the user identification information included in the first information, the user is easily billed.

Note that the program of the present invention may be provided being recorded on a computer readable medium. Those who are skilled in the art would know that computer readable media are not limited to any specific type of apparatus, and include, but are not limited to: CD's, RAM's ROM's, hard disks, magnetic tapes, and internet downloads, in which computer instructions can be stored and/or transmitted. Transmission of the computer instructions through a network or through wireless transmission means is also within the scope of this invention. Additionally, the computer instructions include, but are not limited to: source, object, and executable code, and can be in any language, including higher level languages, assembly language, and machine language.

DESCRIPTION OF THE PREFERRED EMBODIMENT

Hereinafter, an embodiment of the present invention will be described with reference to the accompanying drawings.

Figure 1:
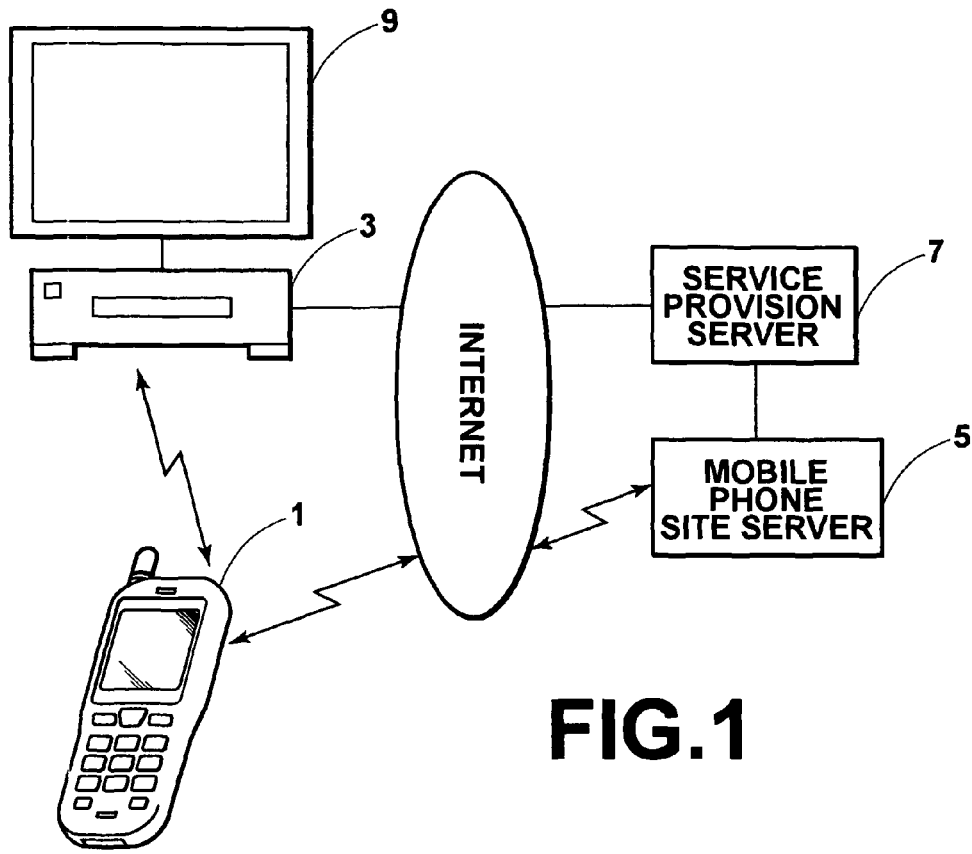
FIG. 1 is a block diagram showing the configuration of a printing system adopting an information processing system of an embodiment of the present invention.

FIG. 1 is a block diagram showing the configuration of a printing system adopting an information processing system of an embodiment of the present invention. As shown in FIG. 1, the printing system in this embodiment comprises a mobile phone 1, a DVD/HDD recorder (hereinafter simply referred to as the recorder) 3, a mobile phone site server 5, and a service provision server 7. The recorder 3 is connected to a TV set 9.

Figure 2:
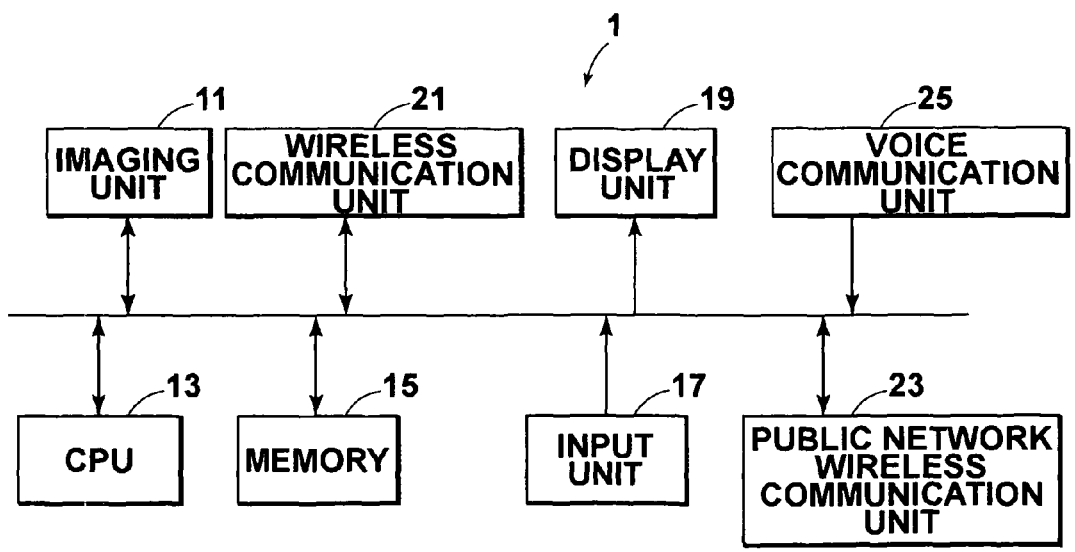
FIG. 2 is a block diagram showing the configuration of a mobile phone.

FIG. 2 is a block diagram showing the configuration of the mobile phone 1. As shown in FIG. 2, the mobile phone 1 comprises an imaging unit 11, a CPU 13, a memory 15, an input unit 17, a display unit 19, and a wireless communication unit 21. The imaging unit 11 generates a subject image focused on a light reception surface thereof, and carries out photoelectric conversion on the subject image. The imaging unit 11 also carries out an A/D conversion and image processing on the image, and outputs the image as digital image data. The CPU 13 controls the entire mobile phone 1, and also carries out various kinds of control such as sampling timing control and recording control of the image data, communication control, and display control. The memory 15 comprises an area storing software such as a program for operating the CPU 13, an identification code for identifying a user, and various kinds of constants. The memory 15 also comprises an area used by the CPU 13 as a workspace and an area for storing the image data. The input unit 17 is used by the user for inputting various kinds of instructions to the mobile phone 1. The display unit 19 comprises an LCD or the like used for various kinds of display including display of the image data. The wireless communication unit 21 carries out short-range wireless communication by using infrared communication or Bluetooth, for example.

The mobile phone 1 also comprises a public network wireless communication unit 23 for sending and receiving an e-mail message and for carrying out voice communication by wireless communication with a public network, and a voice communication unit 25 comprising a microphone and a speaker for voice communication.

By having the configuration described above, the mobile phone 1 can store the image data obtained by the imaging unit 11 in the memory 15. The mobile phone 1 can also carry out voice communication, can access the Internet, and can send and receive an e-mail message by the public network wireless communication unit 23 and the voice communication unit 25. The mobile phone 1 can also carry out wireless communication with an apparatus having a corresponding wireless communication unit, by using the wireless communication unit 21.

Figure 3:
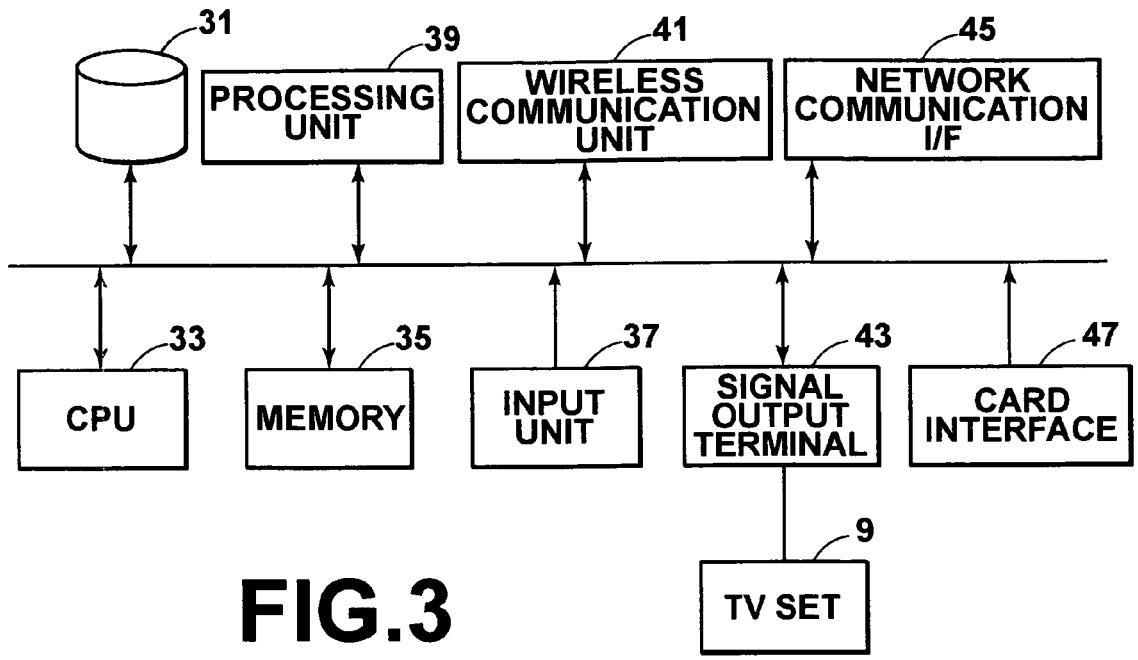
FIG. 3 is a block diagram showing the configuration of a recorder.

FIG. 3 is a block diagram showing the configuration of the recorder 3. As shown in FIG. 3, the recorder 3 comprises a storage unit 31, a CPU 33, a memory 35, an input unit 37, a processing unit 39, and a wireless communication unit 41. The storage unit 31 has an HDD and a DVD recorder for storing image data and moving image data that have been recorded. The CPU 33 controls the entire recorder 3, and carries out various kinds of control such as recording control of the image data and the moving image data, communication control, and display control. The memory 35 comprises an area storing software such as a program for operating the CPU 33 and various kinds of constants. The memory 35 also has an area as a workspace used by the CPU 33. The input unit 37 is used by the user for inputting various kinds of instructions to the recorder 3. The processing unit 39 carries out processing such as encoding and decoding of the image data and the moving image data. The wireless communication unit 41 carries out short-range wireless communication by using infrared communication or Bluetooth, for example.

The recorder 3 also has a signal output unit 43 for outputting an audio signal and a video signal to the TV set 9, a network communication interface 45 connected to the Internet, and a card interface 47 for reading image data from a memory card. In this embodiment, the recorder 3 has a broadband connection.

By having the configuration described above, the recorder 3 can display the image data and the moving image data stored in the storage unit 31 on the TV set 9. In addition, the recorder 3 can read the image data from the memory card (not shown) by using the card interface 47, and can store the image data in the storage unit 31. Furthermore, the recorder 3 can send and receive various kinds of information through access to the Internet via the network communication interface 45. The recorder 3 can also carry out wireless communication with an apparatus having a corresponding wireless communication unit, by using the wireless communication unit 41.

Figure 4:
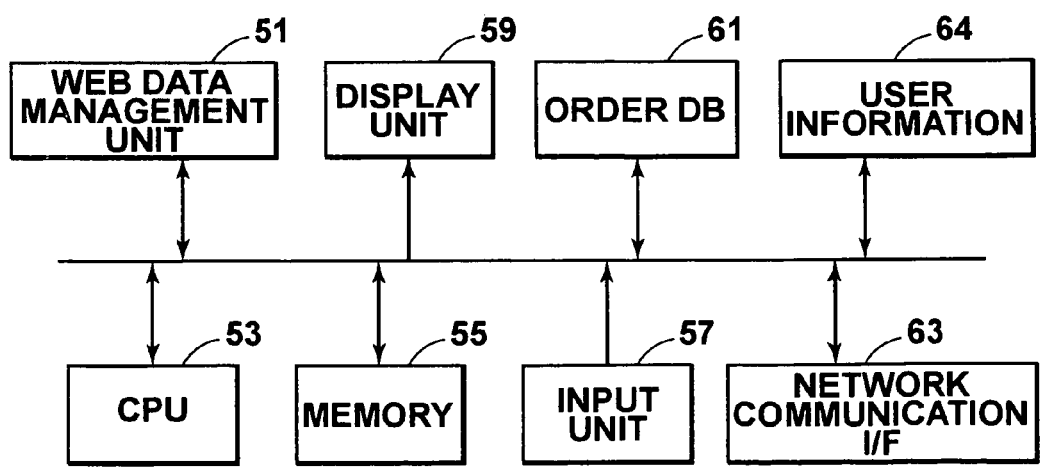
FIG. 4 is a block diagram showing the configuration of a mobile phone site server.

FIG. 4 is a block diagram showing the configuration of the mobile phone site server 5. As shown in FIG. 4, the mobile phone site server 5 comprises a Web data management unit 51, a CPU 53, a memory 55, an input unit 57, and a display unit 59. The Web data management unit 51 manages data for displaying on the mobile phone 1 a Web page of a printing order site managed by the mobile phone site server 5. The CPU 53 controls the entire mobile phone site server 5. The memory 55 comprises an area having software such as a program for operating the CPU 53 and various kinds of constants, and a workspace used by the CPU 53. The input unit 57 is used by a manager of the mobile phone site server 5 for inputting various kinds of instructions to the mobile phone site server 5. The display unit 59 comprises an LCD or the like used for various kinds of display.

The mobile phone site server 5 also has an order database 61 for registering order processing that will be described later, a network communication interface 63 connected to the Internet, and a user information database 64 that stores user information such as the name, the address, and the phone number of the user.

By having the configuration described above, the mobile phone site server 5 can communicate with the mobile phone 1, and can display the Web page of the printing order site on the mobile phone 1. In addition, the mobile phone site server 5 can also register with the order database 61 the order processing based on order information sent from the mobile phone 1 as will be described later.

Figure 5:
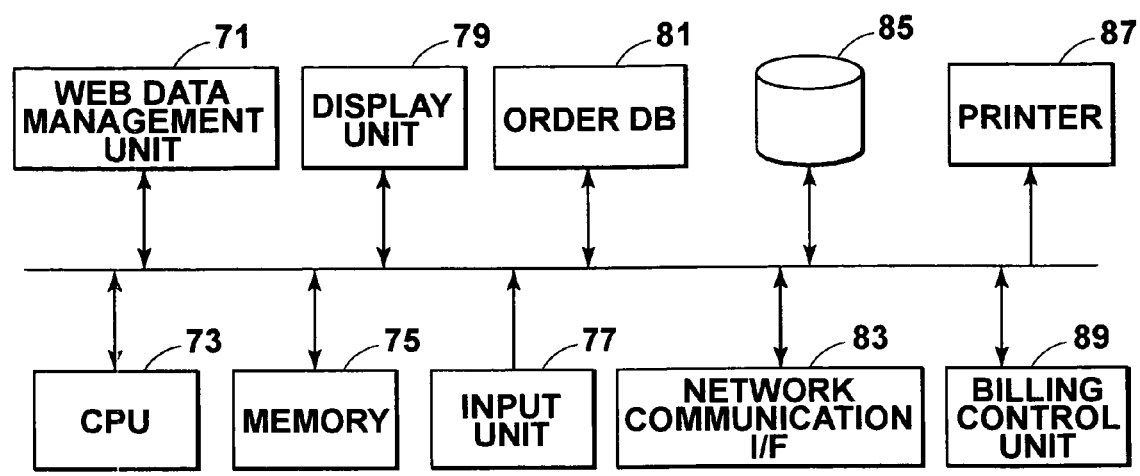
FIG. 5 is a block diagram showing the configuration of a service provision server.

FIG. 5 is a block diagram showing the configuration of the service provision server 7. As shown in FIG. 5, the service provision server 7 comprises a Web data management unit 71, a CPU 73, a memory 75, an input unit 77, and a display unit 79. The Web data management unit 71 manages data for displaying a Web page of a site of the service provision server 7. The CPU 73 controls the entire service provision server 7. The memory 75 comprises an area storing software such as a program for operating the CPU 73 and various kinds of constants, and a workspace for the CPU 73. The input unit 77 is used for inputting various kinds of instructions to the service provision server 7. The display unit 79 comprises an LCD or the like for carrying out various kinds of display.

The service provision server 7 also has an order database 81 for registering the order processing that will be described later, a network communication interface 83 connected to the Internet, a storage unit 75 for storing various kinds of data including image data received via the network communication interface 83, a printer 87 for obtaining a print or prints (hereinafter referred to as the prints) by printing the image data, and a billing control unit 89 for generating billing information to be sent to a carrier of the mobile phone 1 regarding the user who placed the printing order.

By having the configuration described above, the service provision server 7 can display the Web page of the service provision server 7 on the TV set 9 connected to the recorder 3 or on a personal computer by communicating with the recorder 3 or the personal computer. In addition, the service provision server 7 can also register the order processing with the order database 81, based on the order information sent from the mobile phone 1 via the mobile phone site server 5 as will be described later. Furthermore, the service provision server 7 can store the image data in the storage unit 85. Moreover, the service provision server 7 can print the image data from the printer 87, based on the order information. The service provision server 7 can also generate the billing information by using the billing control unit 89, and can send the billing information to the carrier of the mobile phone 1.

Figure 6:
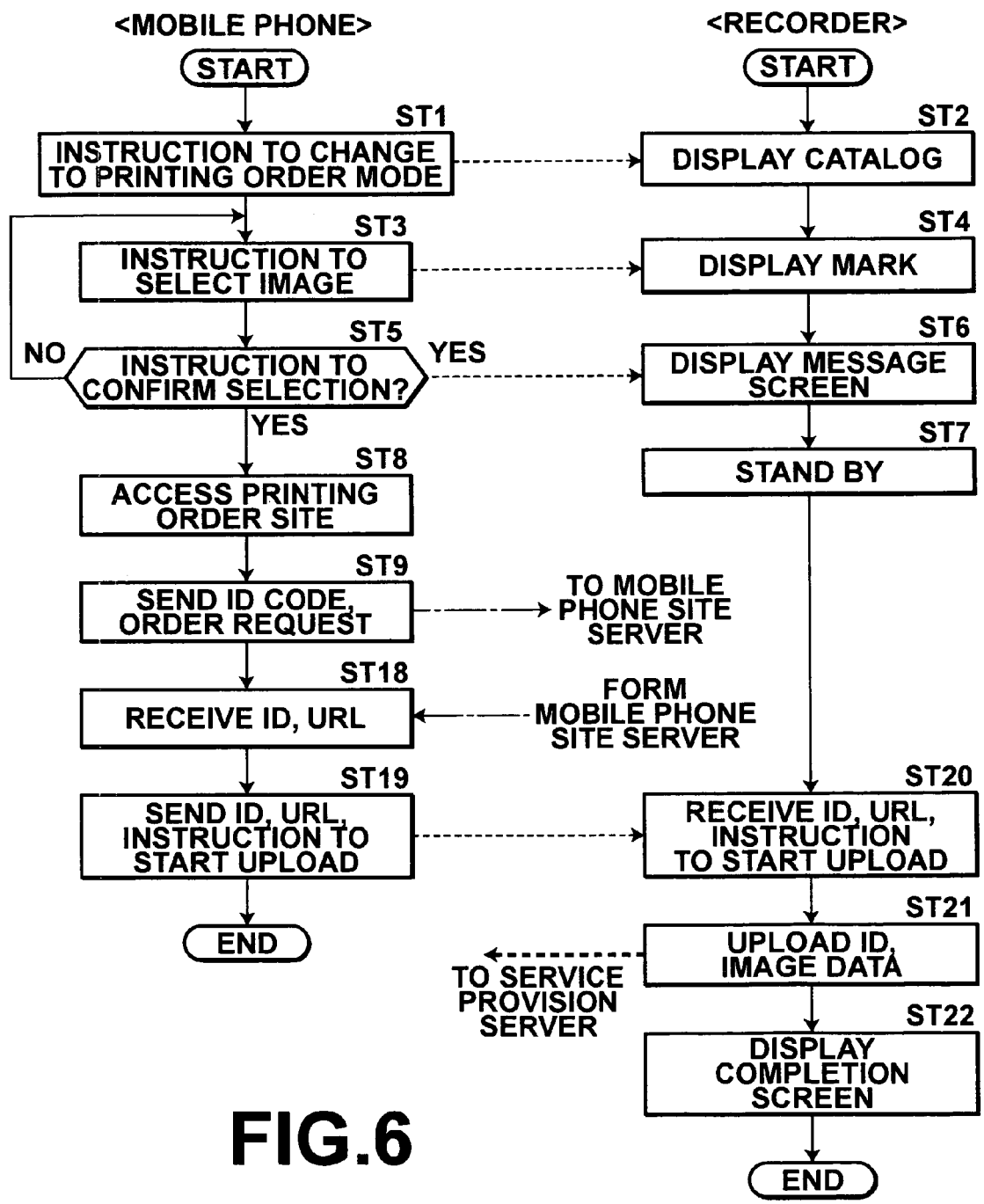
FIG. 6 is a flow chart showing a procedure carried out in this embodiment (part 1)
Figure 7:
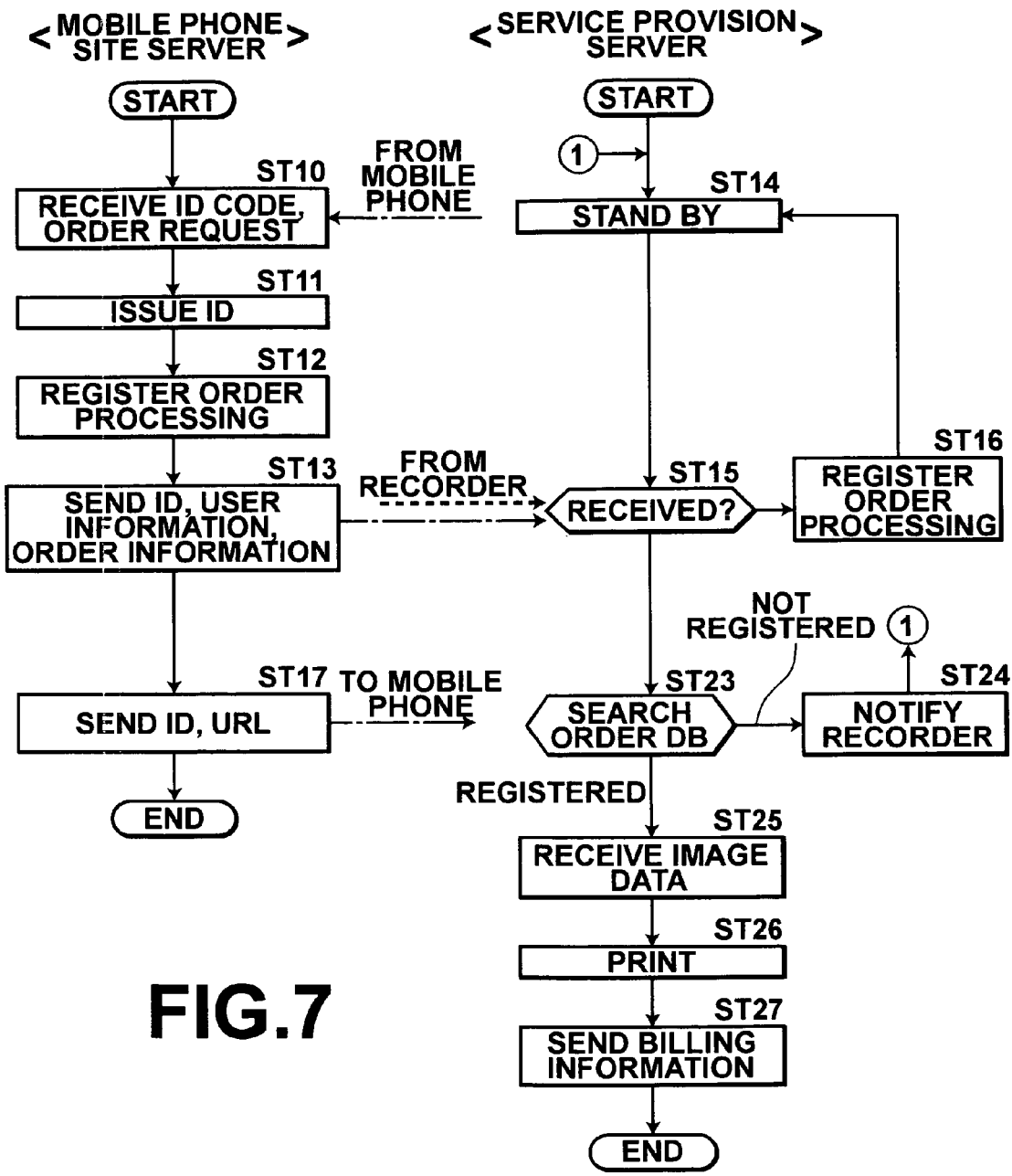
FIG. 7 is a flow chart showing the procedure carried out in this embodiment (part 2)

A procedure carried out in the printing service system in this embodiment will be described next. FIGS. 6 and 7 are flow charts showing the procedure. The storage unit 31 in the recorder 3 already has the image data recorded in the memory card, through input of the image data via the card interface 47.

The mobile phone 1 sends an instruction to change to a printing order mode to the recorder 3 via the wireless communication unit 21, according to operation of the mobile phone 1 by the user (Step ST1). When the recorder 3 receives the instruction via the wireless communication unit 41, the recorder 3 displays a catalog of images stored in the storage unit 31 on the TV set 9 (Step ST2). The user selects any one of the images by using the mobile phone 1 while viewing a screen of the TV set 9. In this manner, an instruction to select the image is sent to the recorder 3 (Step ST3). The recorder 3 receives this instruction, and displays a mark on the image in the catalog (Step ST4).

Figure 8:
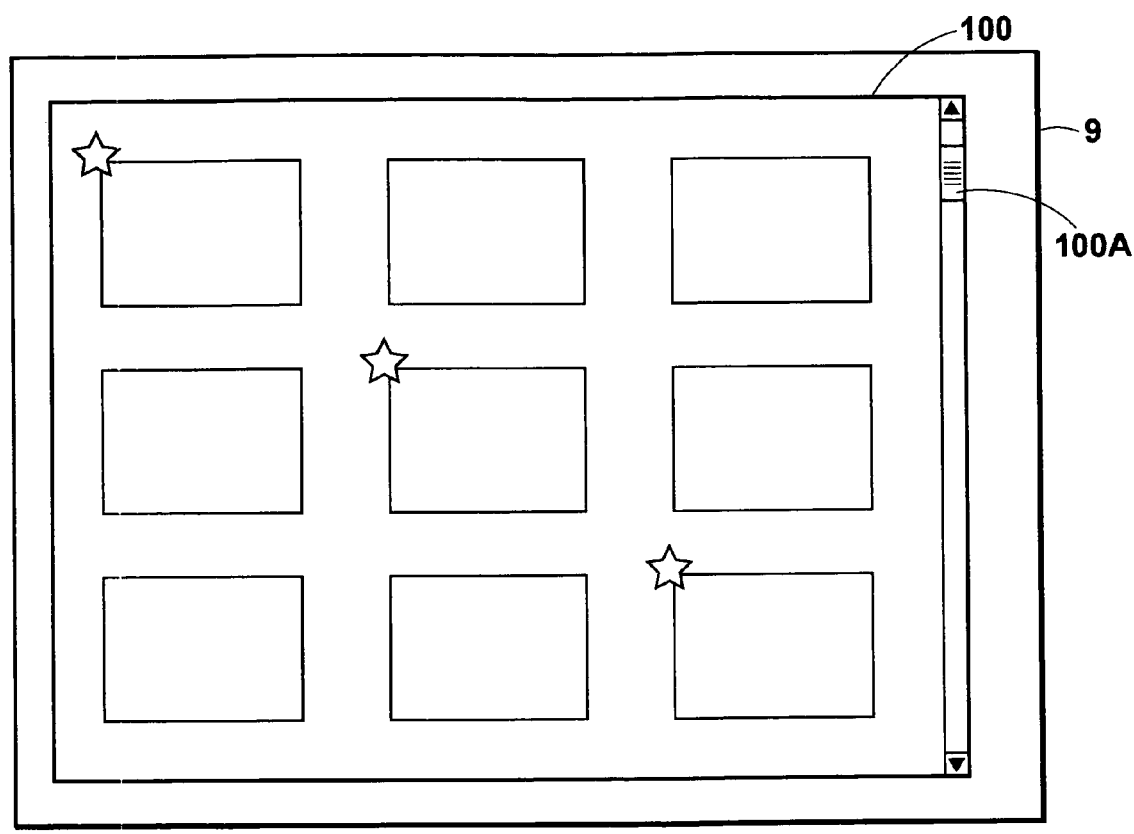
FIG. 8 shows a catalog of images displayed on a TV set.

FIG. 8 shows the screen of the TV set 9 in which the catalog of the images is displayed. As shown in FIG. 8, the catalog of the images stored in the storage unit 31 is shown in a catalog screen 100. A scroll bar 100A is also shown for scrolling the screen. The user can scroll the catalog screen 100 by instructing the recorder 3 to scroll, with use of the mobile phone 1. The images that have been selected are added with star marks. As long as the selected images can be recognized, the selected images can be displayed in any manner instead of the marks. For example, a color of frames for the selected images may be changed.

The mobile phone 1 judges whether the user has input a selection confirmation instruction (Step ST5). In the case where a result of the judgment at Step ST5 is negative, the procedure returns to Step ST3. If the result is affirmative, the mobile phone 1 sends the selection confirmation instruction to the recorder 3 (Step ST6).

When the recorder 3 receives the instruction, the recorder 3 displays on the TV 9 a message screen including a message confirming the selected images, the number of the selected images, and a total size thereof (Step ST7). The recorder 3 is put on stand-by thereafter.

Figure 9:
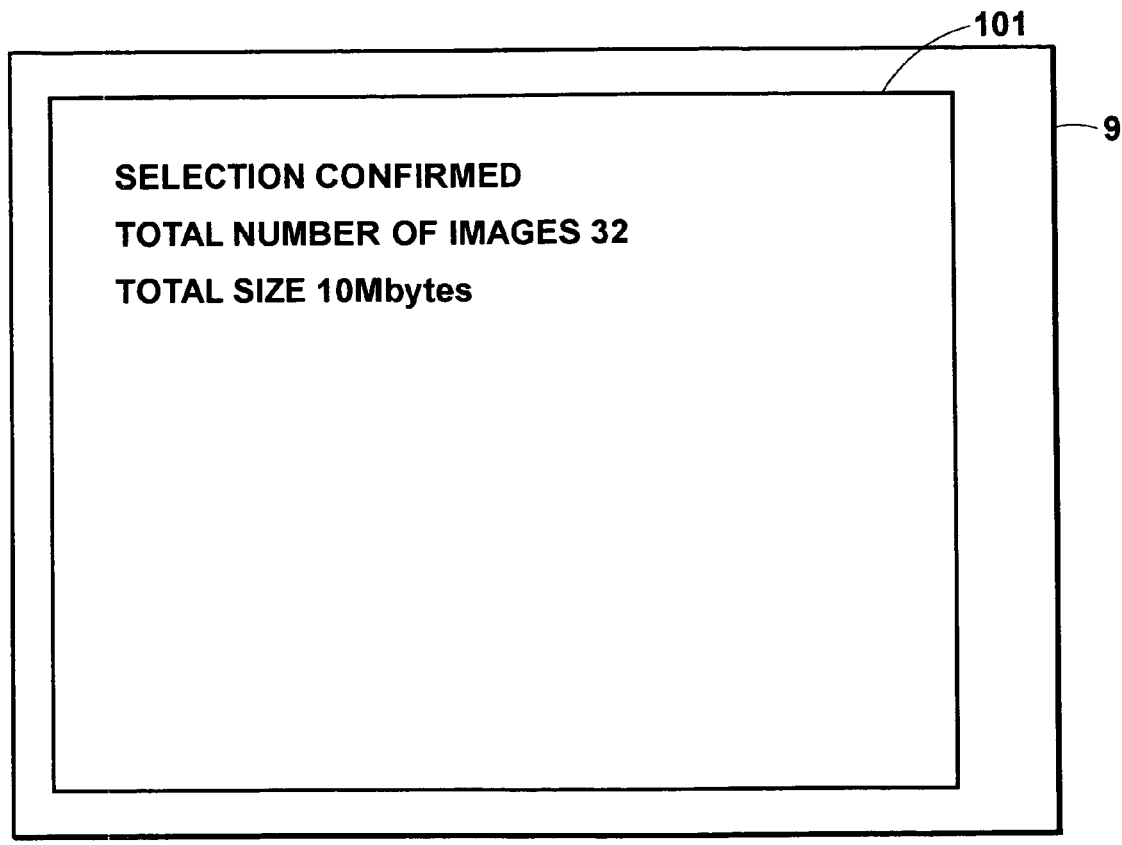
FIG. 9 shows a message screen.

FIG. 9 shows the message screen. As shown in FIG. 9, in a message screen 101 are displayed a message 101A "Selection Confirmed", a total number 101B representing the number of all the selected images (32 images in this case), and a size 101C of all the selected images (10 Mbytes, in this case).

After sending the selection confirmation instruction to the recorder 3, the mobile phone 1 accesses the printing order site of the mobile phone site server 5 via the Internet (Step ST8). The mobile phone 1 then sends the identification code for identifying the user and a request for a printing order to the mobile phone site server 5 from the Web page of the printing order site via the Internet (Step ST9). The identification code can be the phone number of the mobile phone 1. The printing order request includes the order information such as a quantity of the prints and a size thereof.

The mobile phone site server 5 receives the identification code and the printing order request (Step ST10), and issues an ID for identifying the request (Step ST11). The ID may be a combination of numbers and symbols of 128 bits, for example. The mobile phone site server 5 registers with the order database 61 the ID, the identification code, and the order information included in the request as one set of the order processing (Step ST12). The mobile phone site server 5 then refers to the user information database 64 for obtaining the user information corresponding to the identification code, and sends the ID, the user information, and the order information to the service provision server 7 via the Internet (Step ST13).

The service provision server 7 has been put on stand-by (Step ST14), and starts processing upon reception of some instruction (Step ST15). In this case, the service provision server 7 receives the ID, the user information, and the order information sent by the mobile phone site server 5, and registers with the order database 81 the ID, the user information, and the order information as one set of the order processing (Step ST16). The procedure then returns to Step ST14.

Meanwhile, the mobile phone site server 5 sends to the mobile phone 1 via the Internet a URL (the URL of the service provision server 7) used for upload of the ID and the image data (Step ST17), and ends the procedure therefor.

The mobile phone 1 receives the ID and the URL sent from the mobile phone site server 5 (Step ST18). The mobile phone 1 sends the ID and the URL to the recorder 3 via the wireless communication unit 21, and instructs the recorder 3 to start the upload (Step ST19) to end the procedure therefor.

The recorder 3 receives via the wireless communication unit 41 the ID, the URL, and the upload starting instruction sent by the mobile phone 1 (Step ST20), and uploads the ID and the image data of the selected images to the service provision server 7 via the Internet (Step ST21). When the upload is completed, the recorder 3 displays a completion screen including a message such as "Upload Completed" on the TV set 9 (Step ST22), and ends the procedure therefor. The completion screen may be sent directly to the mobile phone 1.

The service provision server 7 receives the ID (Step ST15), and searches the order database 81 for the set of the order processing including the ID (Step ST23). In the case where the set of the order processing has not been registered, the service provision server 7 notifies the recorder 3 of the fact (Step ST24), and the procedure returns to Step ST14. A message such as "The order processing has not been registered" is displayed on the recorder 3, and the image data uploaded by the recorder 3 are not received.

In the case where the set of the order processing has been registered, the service provision server 7 receives the image data uploaded by the recorder 3 (Step ST25). The service provision server 7 then carries out printing processing (Step ST26). More specifically, the image data are printed by the printer 87 to obtain the prints based on the order information registered with the order database 81, and provides the prints to a print shipping process according to the user information. In this manner, the prints are delivered to the user who placed the printing order.

After the printing processing, the billing control unit 89 of the service provision server 7 generates the billing information for the printing service according to the user information and the order information, and sends the billing information to the carrier of the mobile phone 1 (Step ST27) to end the procedure.

The carrier of the mobile phone 1 receives the billing information, and withdraws a fee including a printing service charge and a mobile phone usage charge from a bank account of the user. The charge for the printing service is paid to a company running the service provision server 7.

As has been described above, according to this embodiment, the printing order request including the identification code of the user and the order information is sent from the mobile phone 1 to the mobile phone site server 5, and the mobile phone site server 5 sends the user information corresponding to the identification code and the order information to the service provision server 7. The image data regarding which the printing order has been placed are sent from the recorder 3 to the service provision server 7, and the service provision server 7 prints the image data based on the order information. Therefore, the user can obtain the prints by simply sending the identification code and the printing order request from the mobile phone 1 and by instructing the recorder 3 to send the image data to the service provision server 7. In this manner, the user can efficiently receive the printing service.

In addition, the ID is issued by the mobile phone site server 5 and the set of the order processing including the ID is registered with the service provision server 7. Whether or not the set of the order processing has been registered is judged based on the ID sent together with the image data. Therefore, printing of image data without a printing order thereof can be prevented, leading to prevention of the cost therefor becoming uncollectible due to impossibility of user identification.

Furthermore, since the user is billed via the carrier of the mobile phone 1 based on the user information, the company providing the printing service can securely collect the cost needed for provision of the service.

Moreover, since the image data are uploaded from the recorder 3 having the broadband connection, the user can shorten the time necessary for transmission. Therefore, the user can efficiently receive the printing service.

In the embodiment described above, the service provision server 7 may have the functions of the mobile phone site server 5. In this case, the information exchanged via the Internet between the mobile phone site server 5 and the service provision server 7 is exchanged locally within the service provision server 7.

In the above-described embodiment, the mobile phone site server 5 issues the ID. However, the service provision server 7 may issue the ID. In this case, when the service provision server 7 receives an instruction to issue the ID from the mobile phone site server 5, the service provision server 7 issues the ID and sends the ID to the mobile phone site server 5. The mobile phone site server 5 receives the ID, and sends the ID to the mobile phone 1. The mobile phone site server 5 also registers the set of the order processing including the ID with the order database 61, and sends the user information and the order information to the service provision server 7. The service provision server 7 registers with the order database 81 the user information and the order information together with the ID issued by the service provision server 7 as the set of the order processing.

The mobile phone 1 may also issue the ID. In this case, the mobile phone 1 sends the identification code, the printing order request and the ID to the mobile phone site server 5. The mobile phone site server 5 registers with the order database 61 the ID, the identification code, and the order information included in the printing order request as the set of the order processing. The mobile phone site server 5 sends the ID, the user information, and the order information to the service provision server 7 via the Internet. The mobile phone site server 5 also sends only the URL to the mobile phone 1. The mobile phone 1 sends the ID, which has been issued by the mobile phone 1 and sent from the mobile phone site server 5, to the recorder 3 together with the URL.

The recorder 3 may also issue the ID. In this case, the recorder 3 sends the ID from the wireless communication unit 41 to the mobile phone 1. The ID may be displayed on the TV set 9 so that the user of the mobile phone 1 can directly input the ID to the mobile phone 1. The mobile phone 1 sends the identification code, the printing order request, and the ID to the mobile phone site server 5. The mobile phone site server 5 registers the ID, the identification code, and the order information included in the printing order request as the set of the order processing with the order database 61. The mobile phone site server 5 sends the ID, the user information, and the order information to the service provision server 7 via the Internet. The mobile phone site server 5 also sends only the URL to the mobile phone 1. The mobile phone 1 sends the URL to the recorder 3. The recorder 3 sends the image data and the ID issued by the recorder 3 to the URL.

What is claimed is:

1. An information storage apparatus comprising:
   first communication means for communicating with an information processing apparatus, the information processing apparatus comprising communication means for sending and receiving various kinds of information, information processing means for providing a service according to the various kinds of information received by the communication means, and control means for controlling the communication means and the information processing means in order to cause first information and second information to be received and in order to cause the service relating the first information and the second information to be provided according to the identification information, the first information being sent from a first apparatus enabling user identification, the first information including user identification information for identifying a user and a request for provision of the service, and the second information being sent from a second apparatus not enabling user identification;
   second communication means for communication with a mobile terminal the mobile terminal comprising:
   storage means for storing user identification information for identifying a user;
   first communication means for communicating with the information processing apparatus;
   control means for controlling the storage means, the first communication means, and the second communication means for causing the second information that is to be sent to the information processing apparatus to be specified in the information storage apparatus, for causing first information including the user identification information and a request for provision of a service to be sent to the information processing apparatus, for causing addressee information representing an addressee of the specified second information and sent from the information processing apparatus to be received and to be sent to the information storage apparatus, and for causing the information storage apparatus to be instructed to send the specified second information together with identification information for identifying the first information to the addressee; and
   the information storage apparatus further comprising:
   storage means for storing second information, the information storage apparatus comprising control means for controlling the storage means, the first communication means, and the second communication for causing specification of the second information that is to be sent to the information processing apparatus to be received from the mobile terminal, for causing second information to be received from the mobile terminal together with identification information that identifies the first information and an instruction to send the specified second information to the addressee, and for causing the identification information and the specified second information to be sent the addressee.

2. The information processing apparatus according to claim 1, wherein the control means relates the first information and the second information based on the identification information issued by the first apparatus, the second apparatus, or the information processing apparatus itself.

3. The information processing apparatus according to claim 1, wherein, in the case where the request for provision of the service is a request for placing a printing order regarding an image, and in the case where the second information is image data representing the image regarding which the printing order is placed, the control means provides a printing service of the image data by relating the request for placing the printing order to the image data.

4. The information processing apparatus according to claim 1, wherein the control means generates billing information for the service to the user who sent the first information, based on the user identification information included in the first information.

5. An information processing system comprising:
   a first apparatus enabling user identification and sending a first information including user identification information for identifying a user and a request for provision of a service;
   a second apparatus not enabling user identification and storing and sending second information;
   an information processing apparatus comprising communication means for sending and receiving various kinds of information, information processing means for providing a service according to the various kinds of information received by the communication means, and system control means for controlling the communication means and the information processing means in order to cause first information processing means in order to cause first information and second information to be received and in order to cause the service relating the first information and the second information to be provided according to identification information, the first information being sent from a first apparatus enabling user identification, the first information including user identification information for identifying a user and a request for provision of the service, and the second information being sent from a second apparatus not enabling user identification
   wherein the first apparatus is a mobile terminal comprising:
   storage means for storing user identification information for identifying a user;
   first communication means for communicating with an information processing apparatus, the information processing apparatus comprising communication means for sending and receiving various kinds of information, information processing means for providing a service according to the various kinds of information received by the communication means, and information processing control means for controlling the communication means and the information processing means in order to cause first information and second information to be received and in order to cause the service relating the first information and the second information to be provided according to identification information, the first information being sent from a first apparatus enabling user identification, the first information including user identification information for identifying a user and a request for provision of the service, and the second information being sent from a second apparatus not enabling user identification;

second communication means for communicating with an information storage apparatus storing second information; and mobile terminal control means for controlling the storage means, the first communication means, and the second communication means for causing the second information that is to be sent to the information processing apparatus to be specified in the information storage apparatus, for causing first information including the user identification information and the request for provision of the service to be sent to the information processing apparatus, for causing addressee information representing an addressee of the specified second information and sent from the information processing apparatus to be received and to be sent to the information storage apparatus, and for causing the information storage apparatus to be instructed to send the specified second information together with identification information for identifying the first information to the addressee.

6. The information processing system according to claim 5, wherein the second apparatus is an information storage apparatus comprising:

first information processing communication means for communicating with an information processing apparatus, the information processing apparatus comprising communication means for sending and receiving various kinds of information, information processing means for providing a service according to the various kinds of information received by the communication means, and information processing control means for controlling the communication means and the information processing means in order to cause first information and second information to be received and in order to cause the service relating the first information and the second information to be provided according to identification information, the first information being sent from a first apparatus enabling user identification, the first information including user identification information for identifying a user and a request for provision of the service, and the second information being sent from a second apparatus not enabling user identification;

second communication means for communicating with a mobile terminal, the mobile terminal comprising:

storage means for storing user identification information for identifying a user;

first mobile terminal communication means for communicating with the information processing apparatus;

second mobile terminal communication means for communicating with an information storage apparatus storing second information; and mobile terminal control means for controlling the storage means, the first mobile terminal communication means, and the second mobile terminal communication means for causing the second information that is to be sent to the information processing apparatus to be specified in the information storage apparatus., for causing first information including the user identification information and a request for provision of the service to be sent to the information processing apparatus, for causing addressee information representing an addressee of the specified second information and sent from the information processing apparatus to be received and to be sent to the information storage apparatus, and for causing the information storage apparatus to be instructed to send the specified second information together with identification information for identifying the first information to the addressee;

storage means for storing second information; and information storage control means for controlling the storage means, the first information processing communication means, and the second communication means for causing specification of the second information that is to be sent to the information processing apparatus to be received from the mobile terminal, for causing addressee information representing an addressee of the specified second information to be received from the mobile terminal together with identification information that identifies the first information and an instruction to send the specified second information to the addressee, and for causing the identification information and the specified second information to be sent to the addressee.

7. An information processing method for an information storage apparatus, the information storage apparatus comprising:

first communication means for communicating with an information processing apparatus, the information processing apparatus comprising: communication means for sending and receiving various kinds of information, information processing means for providing a service according to the various kinds of information received by the communication means, and control means for controlling the communication means and the information processing means in order to cause first information and second information to be received and in order to cause the service relating the first information and the second information to be provided according to identification information, the first information being sent from a first apparatus enabling user identification, the first information including user identification information for identifying a user and a request for provision of the service, and the second information being sent from a second apparatus not enabling user identification, second communication means for communicating with a mobile terminal the mobile terminal comprising:

storage means for storing user identification information for identifying a user;

first communication means for communicating with the information processing apparatus;

control means for controlling the storage means, the first communication means, and the second communication means for causing the second information that is to be sent to the information processing apparatus to be specified in the information storage apparatus, for causing first information including the user identification information and a request for provision of a service to be sent to the information processing apparatus, for causing addressee information representing an addressee of the specified second information and sent from the information processing apparatus to be received and to be sent to the information storage apparatus, and for causing the information storage apparatus to be instructed to send the specified second information together with identification information for identifying the first information to the addressee; and the information storage apparatus further comprising:

storage means for storing second information, the information processing method comprising the steps of:

receiving, from the mobile terminal, specification of the second information to be sent to the information processing apparatus;

receiving from the mobile terminal an instruction to send the specified second information to an addressee, together with addressee information representing the addressee of the specified second information and identification information for identifying the first information; and sending the identification information and the specified second information to the addressee.

8. A non-transitory computer readable medium having stored thereon an information processing method used in an information storage apparatus, the information storage apparatus comprising:

first communication means for communicating with an information processing apparatus, the information processing apparatus comprising: communication means for sending and receiving various kinds of information, information processing means for providing a service according to the various kinds of information received by the communication means, and control means for controlling the communication means and the information processing means in order to cause first information and second information to be received and in order to cause the service relating the first information and the second information to be provided according to identification information, the first information being sent from a first apparatus enabling user identification, the first information including user identification information for identifying a user and a request for provision of the service, and the second information being sent from a second apparatus not enabling user identification, second communication means for communicating with a mobile terminal the mobile terminal comprising:

storage means for storing user identification information for identifying a user;

first communication means for communicating with the information processing apparatus;

control means for controlling the storage means, the first communication means, and the second communication means for causing the second information that is to be sent to the information processing apparatus to be specified in the information storage apparatus, for causing first information including the user identification information and a request for provision of a service to be sent to the information processing apparatus, for causing addressee information representing an addressee of the specified second information and sent from the information processing apparatus to be received and to be sent to the information storage apparatus, and for causing the information storage apparatus to be instructed to send the specified second information together with identification information for identifying the first information to the addressee; and the information storage apparatus further comprising:

storage means for storing second information, the method comprising the steps of:

receiving, from the mobile terminal, specification of the second information to be sent to the information processing apparatus;

receiving from the mobile terminal an instruction to send the specified second information to an addressee, together with addressee information representing the addressee of the specified second information and identification information for identifying the first information; and sending the identification information and the specified second information to the addressee.

* * * * *